(12) United States Patent
Kim

(10) Patent No.: US 11,648,926 B2
(45) Date of Patent: May 16, 2023

(54) SOLENOID VALVE

(71) Applicant: HL MANDO CORPORATION, Pyeongtaek-si (KR)

(72) Inventor: Yeon Seong Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 66 days.

(21) Appl. No.: 17/285,988

(22) PCT Filed: Oct. 16, 2019

(86) PCT No.: PCT/KR2019/013586
§ 371 (c)(1),
(2) Date: Apr. 16, 2021

(87) PCT Pub. No.: WO2020/080824
PCT Pub. Date: Apr. 23, 2020

(65) Prior Publication Data
US 2021/0370903 A1 Dec. 2, 2021

(30) Foreign Application Priority Data
Oct. 16, 2018 (KR) .......................... 10-2018-0123009

(51) Int. Cl.
*F16K 27/02* (2006.01)
*F16K 31/06* (2006.01)
(Continued)

(52) U.S. Cl.
CPC ............ *B60T 15/028* (2013.01); *B01D 29/31* (2013.01); *B01D 29/56* (2013.01);
(Continued)

(58) Field of Classification Search
CPC ...... F16K 1/34; F16K 27/029; F16K 31/0644; F16K 31/0665; F16K 31/0689; B60T 8/366; B60T 13/686; B60T 15/028
(Continued)

(56) References Cited

U.S. PATENT DOCUMENTS 5,603,483 A * 2/1997 Reuter ................ F16K 31/0655
251/210
5,984,261 A * 11/1999 Akita ................. F16K 31/0665
303/119.2
(Continued)

FOREIGN PATENT DOCUMENTS

| JP | 2004-125117 A | 4/2004 |
| JP | 2015-094415 A | 5/2015 |

(Continued)

OTHER PUBLICATIONS

International Search Report dated Feb. 19, 2020, corresponding to International Application No. PCT/KR2019/013586 citing the above reference(s).

*Primary Examiner* — Matthew W Jellett
(74) *Attorney, Agent, or Firm* — Hauptman Ham, LLP

(57) ABSTRACT

The present disclosure relates to a solenoid valve. The solenoid valve includes an armature provided inside the sleeve, a plunger configured to ascend and descend by the operation of the armature, an elastic member configured to press the plunger toward the armature, a magnet core having a through hole in which the plunger and the elastic member are provided and forming an inner space in a longitudinal direction, a valve seat provided in the inner space and on which an orifice penetrating in an axial direction is formed to be opened and closed by the plunger, and a plurality of flow resistance members each including a ring body interposed between the valve seat and the magnet core to generate a flow resistance of a braking fluid, and a slot (Continued)

formed at one side of the ring body to penetrate through the ring body so that the braking fluid passes therethrough.

17 Claims, 8 Drawing Sheets

(51) Int. Cl.
*B60T 15/02* (2006.01)
*B01D 29/31* (2006.01)
*B01D 29/56* (2006.01)
*B01D 35/147* (2006.01)
*B60T 13/68* (2006.01)

(52) U.S. Cl.
CPC ........ *B01D 35/1475* (2013.01); *B60T 13/686* (2013.01); *F16K 27/029* (2013.01); *F16K 31/0665* (2013.01)

(58) Field of Classification Search
USPC .......................................... 251/127; 303/119.2
See application file for complete search history.

(56) References Cited

U.S. PATENT DOCUMENTS

| | | | | |
|---|---|---|---|---|
| 6,224,170 B1 * | 5/2001 | Hosoya | ................ | B60T 8/5025 303/119.2 |
| 6,322,049 B1 * | 11/2001 | Hofmann | ................ | B60T 8/363 303/119.2 |
| 8,579,251 B2 * | 11/2013 | Ambrosi | ............ | F16K 31/0665 137/601.21 |
| 8,651,453 B2 * | 2/2014 | Heyer | ................... | B60T 8/363 251/129.02 |
| 9,074,701 B2 * | 7/2015 | Karl | ........................ | F16K 1/32 |
| 9,139,179 B2 * | 9/2015 | Heyer | ................... | B60T 8/363 |

FOREIGN PATENT DOCUMENTS

| | | | | |
|---|---|---|---|---|
| KR | 10-2005-0047983 A | | 5/2005 | |
| KR | 10-2009-0037014 A | | 4/2009 | |
| KR | 10-1683858 B1 | | 12/2016 | |
| KR | 10-2017-0079250 A | | 7/2017 | |
| KR | 10-2018-0094289 A | | 8/2018 | |
| KR | 20180094289 A | * | 8/2018 | ......... F16K 31/0644 |

* cited by examiner

SOLENOID VALVE

CROSS-REFERENCE TO RELATED APPLICATION

This present application is a national stage filing under 35 U.S. § 371 of PCT application number PCT/KR2019/013586 filed on Oct. 16, 2019, which is based upon and claims the benefit of priority to Korean Patent Application No. 10-2018-0123009 filed Oct. 16, 2018 in the Korean Intellectual Property Office. The disclosures of the above-listed applications are hereby incorporated by reference herein in their entireties.

Technical Field

The present disclosure relates to a solenoid valve, and more particularly, to a solenoid valve for reducing vibration and noise during operation by slowing a fluid flow.

Background Art

A hydraulic brake system for braking is essentially installed in a vehicle, and in recent years, various kinds of systems have been proposed to obtain a more powerful and stable braking force.

As an example, the hydraulic brake system includes an electronic stability control system (ESC) for stably maintaining the running state of a vehicle, an anti-lock brake system (ABS) for preventing slippage of wheels during braking, a hill start assist (HSA) for automatically braking while a driver moves his or her foot from a brake pedal to an accelerator pedal on a slope, a brake traction control system (BTCS) for preventing drive wheels from slipping when a vehicle suddenly starts or suddenly accelerates, and the like.

In the case of the electronic stability control system, a certain level of flow delivery is required for braking and braking release, and a plurality of electronically controlled solenoid valves is installed in a modulator block to implement such a system.

When a solenoid valve is operated, current is applied to an excitation coil and a magnetic force is generated between an armature and a plunger. At this time, as an orifice is opened and closed and an inner flow path is momentarily opened, a fluid is supplied rapidly to form a vortex and may cause vibration and noise, which may cause discomfort when driving a vehicle.

Korean Patent Publication No. 10-2009-0037014 has been published on Apr. 15, 2009 as an example of the prior art.

DISCLOSURE

Technical Problem

The present disclosure is directed to providing a solenoid valve capable of reducing vibration and noise during operation by slowing a fluid flow.

The present disclosure is directed to providing a solenoid valve with improved ease of assembly and ease of production by having a simple structure and being additionally applicable to existing products.

The present disclosure is directed to providing a solenoid valve capable of improving design freedom of a brake system and miniaturizing a product.

The present disclosure is directed to providing a solenoid valve capable of improving vehicle performance by reducing dragging when a hydraulic pressure is released.

The present disclosure is directed to providing a solenoid valve in which even when a plurality of flow resistance members is in close contact with each other, a flow path may be formed by a gap maintaining protrusion.

The present disclosure is directed to providing a solenoid valve in which a magnetic core or a valve seat is provided with a step so that a certain distance may be maintained between the flow resistance members and a flow path may be formed.

The present disclosure is directed to providing a solenoid valve in which an outlet filter and an inlet filter are provided with a filter part, respectively, so that foreign substances of fluid passing through a second hydraulic port and a first hydraulic port may be removed.

Technical Solution

An aspect of the present disclosure provides a solenoid valve configured to be installed in a bore of a modulator block having a first hydraulic port and a second hydraulic port to control a flow of a braking fluid, which includes an armature provided inside the sleeve, a plunger configured to ascend and descend by the operation of the armature, an elastic member configured to press the plunger toward the armature, a magnet core having a through hole in which the plunger and the elastic member are provided and forming an inner space in a longitudinal direction, a valve seat provided in the inner space and on which an orifice penetrating in an axial direction is formed to be opened and closed by the plunger, and a plurality of flow resistance members each including a ring body interposed between the valve seat and the magnet core to generate a flow resistance of a braking fluid, and a slot formed at one side of the ring body to penetrate through the ring body so that the braking fluid passes therethrough.

The respective slots of the plurality of flow resistance members may be disposed in different directions with respect to a central axis.

The respective slots may be disposed in opposite directions with respect to the central axis.

The ring body may include a gap maintaining protrusion protruding from an upper end or a lower end thereof.

The gap maintaining protrusion may be provided such that a width thereof is at least smaller than a width of the ring body and is formed along a circumferential direction.

The solenoid valve may further include an outlet filter including a circumferential portion in which an inner circumferential surface thereof is coupled to an outer circumferential surface of the magnet core, a first filter part provided at a lower end of the circumferential portion to filter out foreign substances contained in the braking fluid flowing through an inner flow path between the first hydraulic port and the orifice, and a boss portion inserted into the valve seat to form a connection flow path between the orifice and the second hydraulic port.

The outlet filter may further include a bypass flow path to communicate the inner flow path and the connection flow path, and the bypass flow path may include a ball valve provided to allow only a flow of the braking fluid from the inner flow path to the connection flow path.

The solenoid valve may further include an inlet filter coupled with the outlet filter and including a second filter part to filter out foreign substances contained in the braking fluid flowing between the second hydraulic port and the connection flow path.

Another aspect of the present disclosure provides a solenoid valve configured to be installed in a bore of a modulator block having a first hydraulic port and a second hydraulic port to control a flow of a braking fluid, which includes an armature provided inside the sleeve, a plunger configured to ascend and descend by the operation of the armature, an elastic member configured to press the plunger toward the armature, a magnet core having a through hole in which the plunger and the elastic member are provided and forming an inner space in a longitudinal direction, a valve seat provided in the inner space and on which an orifice penetrating in an axial direction is formed to be opened and closed by the plunger, and a first ring and a second ring each including a ring body interposed between the valve seat and the magnet core to generate a flow resistance of a braking fluid, and a slot formed at one side of the ring body to penetrate through the ring body so that the braking fluid passes therethrough wherein the magnet core includes a first support protrusion protruding from an inner circumferential surface thereof to support an upper end of the first ring.

The valve seat may include a second support protrusion protruding from an outer circumferential surface thereof to support an upper end of the second ring.

A predetermined gap may be maintained between a lower end of the first ring and the upper end of the second ring.

The respective slots of the first ring and the second ring may be disposed in different directions with respect to a central axis.

The respective slots may be disposed in opposite directions with respect to the central axis.

The solenoid valve may further include an outlet filter including a circumferential portion in which an inner circumferential surface thereof is coupled to an outer circumferential surface of the magnet core, a first filter part provided at a lower end of the circumferential portion to filter out foreign substances contained in the braking fluid flowing through an inner flow path between the first hydraulic port and the orifice, and a boss portion inserted into the valve seat to form a connection flow path between the orifice and the second hydraulic port.

The outlet filter may further include a bypass flow path to communicate the inner flow path and the second hydraulic port, and the bypass flow path may include a ball valve provided to allow only a flow of the braking fluid from the inner flow path to the connection flow path.

The solenoid valve may further include an inlet filter coupled with the outlet filter and including a second filter part to filter out foreign substances contained in the braking fluid flowing between the second hydraulic port and the connection flow path.

Advantageous Effects

A solenoid valve according to an embodiment of the present disclosure can reduce vibration and noise during operation by slowing a fluid flow.

The solenoid valve according to an embodiment of the present disclosure can have improved ease of assembly and ease of production by having a simple structure and being additionally applicable to existing products.

The solenoid valve according to an embodiment of the present disclosure can improve design freedom of a brake system and miniaturize a product.

The solenoid valve according to an embodiment of the present disclosure can improve vehicle performance by reducing dragging when a hydraulic pressure is released.

In the solenoid valve according to an embodiment of the present disclosure, even when a plurality of flow resistance members is in close contact with each other, a flow path can be formed by a gap maintaining protrusion.

In the solenoid valve according to an embodiment of the present disclosure, a magnetic core or a valve seat is provided with a step so that a certain distance can be maintained between the flow resistance members and a flow path can be formed.

In the solenoid valve according to an embodiment of the present disclosure, an outlet filter and an inlet filter are provided with a filter part, respectively, so that foreign substances of fluid passing through a second hydraulic port and a first hydraulic port can be removed.

MODE OF THE DISCLOSURE

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
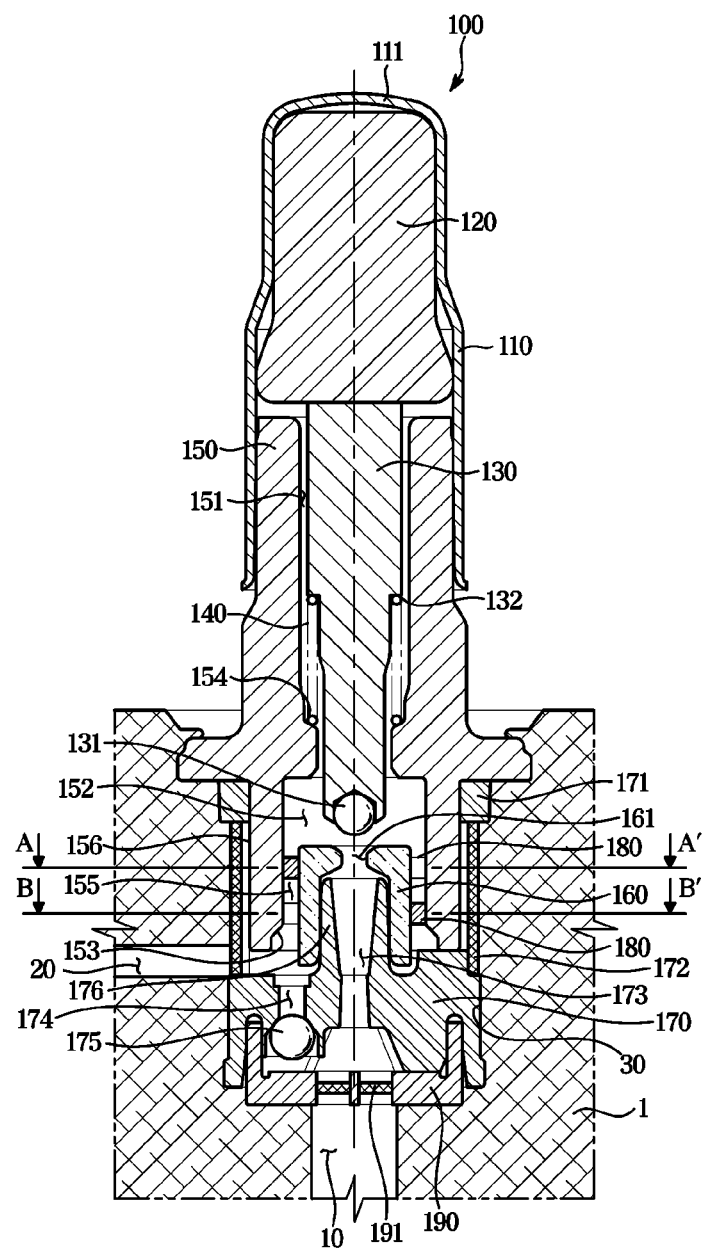
FIG. 1 is a schematic cross-sectional view of a solenoid valve according to an embodiment of the present disclosure.

FIG. 1 is a schematic cross-sectional view of a solenoid valve 100 according to an embodiment of the present disclosure.

Referring to FIG. 1, the solenoid valve 100 may be installed in a bore 30 formed in a modulator block 1 having a first hydraulic port 20 and a second hydraulic port 10 through which a braking fluid such as brake oil flows. The solenoid valve 100 includes a sleeve 110 coupled to the outside of an armature 120, the armature 120 movably installed in the sleeve 110, a plunger 130 to open and close an orifice 161 by ascending and descending by the advancing and retreating movement of the armature 120, an elastic member 140 to press the plunger 130 toward the armature 120, a magnet core 150 having a through hole 151 in which the plunger 130 and the elastic member 140 are provided and forming an inner space 152 in a longitudinal direction, a valve seat 160 provided in the inner space 152 and provided with the orifice 161, and an excitation coil assembly (not shown) installed on the outside of the sleeve 110.

The sleeve 110 is formed in a cylindrical shape having a hollow portion and coupled to the outside of the armature 120. In more detail, the sleeve 110 is provided with a dome-shaped closure 111 such that the armature 120 is press fitted into an upper end thereof.

The sleeve 110 extends downward to close an upper end of the magnet core 150 located below the armature 120.

The armature 120 is located in an upper end of the hollow portion of the sleeve 110, that is, the dome-shaped closure 111, and an outer circumferential surface thereof may be formed in a shape corresponding to an inner circumferential surface of the sleeve 110 to be press fitted thereto.

When power is applied to the excitation coil assembly (not shown), the armature 120 moves the plunger 130 to be spaced apart from the armature 120 by pressing the plunger 130 with an electromagnetic force, so that an opening/closing member 131 of the plunger 130 closes the orifice 161. When power is not applied to the excitation coil assembly (not shown), the elastic member 140 presses the plunger 130 toward the armature 120 so that the orifice 161 is opened.

The plunger 130 may be installed in the through hole 151 of the magnet core 150 to ascend or descend in an axial direction or a vertical direction. The plunger 130 may be provided with the opening/closing member 131 for opening and closing the orifice 161 at a lower end. The opening/closing member 131 may be formed in a ball shape and may be press fitted into a groove formed at the lower end of the plunger 130. However, the shape of the opening/closing member 131 is not limited thereto, and various modifications are possible as long as the orifice 161 may be opened and closed.

The plunger 130 is elastically supported by the elastic member 140 and pressed toward the armature 120 by the elastic force of the elastic member 140 to open the orifice 161 in a normal state or when no current is applied to the valve. In this case, in order for the elastic member 140 to be stably installed to provide an elastic force to the plunger 130, a step portion 132 stepped inward to support one end of the elastic member 140 may be provided on an upper outer circumferential surface of the plunger 130. An elastic member support protrusion 154 having a step shape to support the other end of the elastic member 140 may be provided in the through hole 151 of the magnet core 150. That is, the elastic member 140 may have one end supported by the step portion 132 on the upper outer circumferential surface of the plunger 130 and the other end supported by the elastic member support protrusion 154 of the magnet core 150.

The magnet core 150 forms the through hole 151 in which the plunger 130 and the elastic member 140 are provided and the inner space 152 in communication with the through hole 151, in the longitudinal direction. The inner space 152 is formed as a hollow portion of a cylindrical shape, and an expansion portion 153 whose diameter gradually widens may be provided at a lower end of the inner space 152 in the drawing so that a fluid may pass through an inner flow path 155 and smoothly move to the first hydraulic port 20.

The valve seat 160, which will be described later, is provided in the inner space 152 of the magnet core 150 to form the inner flow path 155 through which a fluid flows between the magnet core 150 and the valve seat 160. In addition, a flow resistance member 180, which will be described later, is interposed between the valve seat 160 and the magnet core 150 to allow the fluid to flow through a slot 182 formed on the flow resistance member 180, thereby increasing a flow resistance and slowing a fluid flow.

The upper end of the magnet core 150 is coupled to the sleeve 110, and a lower end thereof is coupled to an outlet filter 170. In more detail, a lower outer circumferential surface 156 of the magnet core 150 is coupled to a circumferential portion 171 of the outlet filter 170 and a first filter part 172, so that a portion of the magnet core 150 is inserted into the outlet filter 170. Accordingly, the fluid passes through the inner flow path 155 of the magnet core 150 and the first filter part 172 of the outlet filter 170 and then is introduced into the first hydraulic port 20. Conversely, the fluid may flow in the opposite direction. That is, the fluid may pass through the first hydraulic port 20 and the first filter part 172 and be discharged to the second hydraulic port 10 through the inner flow path 155 or a bypass flow path 174, which will be described later.

Figure 2:
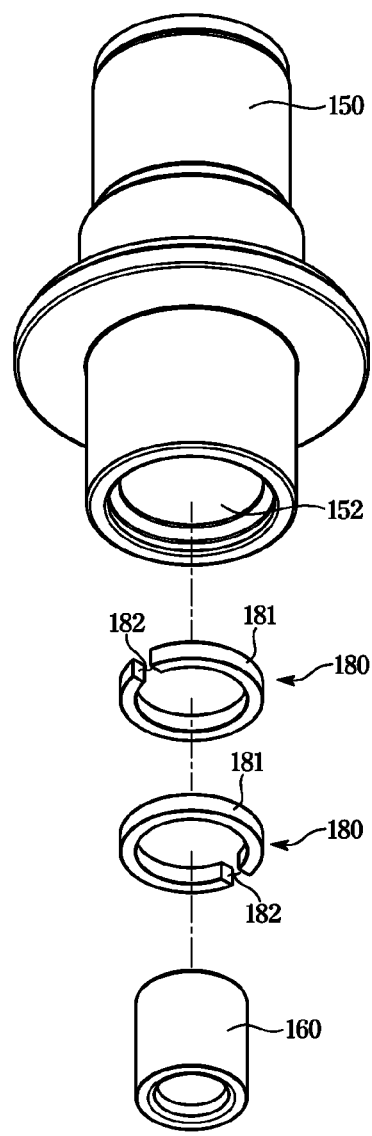
FIG. 2 is an exploded perspective view of a magnet core, a flow resistance member, and a valve seat provided in the solenoid valve according to an embodiment of the present disclosure.

FIG. 2 is an exploded perspective view of a magnet core, a flow resistance member, and a valve seat provided in the solenoid valve according to an embodiment of the present disclosure.

Referring to FIGS. 1 and 2, the valve seat 160 has a cylindrical shape with an open lower end and an empty inside and is press fitted into a boss portion 176 of the outlet filter 170 through the lower opening. An inner circumferential surface of the lower opening of the valve seat 160 may have a shape corresponding to an outer circumferential surface of the boss portion 176 of the outlet filter 170.

The orifice 161 formed through an upper center of the valve seat communicates the inner flow path 155 formed in the inner space 152 and a connection flow path 173 formed in the outlet filter 170 and is selectively opened and closed according to the ascending and descending of the plunger 130 and the opening/closing member 131 located above the valve seat.

The valve seat 160 forms the inner flow path 155 between an inner circumferential surface of the magnet core 150 and an outer circumferential surface of the valve seat 160, and the inner flow path 155 may be formed along the outer circumferential surface of the valve seat 160 by the flow resistance member 180, which will be described later. As the fluid flows along the outer circumferential surface of the valve seat 160, resistance due to friction may be additionally generated, so that the fluid flow may become slow.

A plurality of the flow resistance members 180, which will be described later, may be press fitted into the outer circumferential surface of the valve seat 160. Accordingly, an outer diameter of the valve seat 160 may be provided equal to an inner diameter of the flow resistance member 180.

Figure 3:
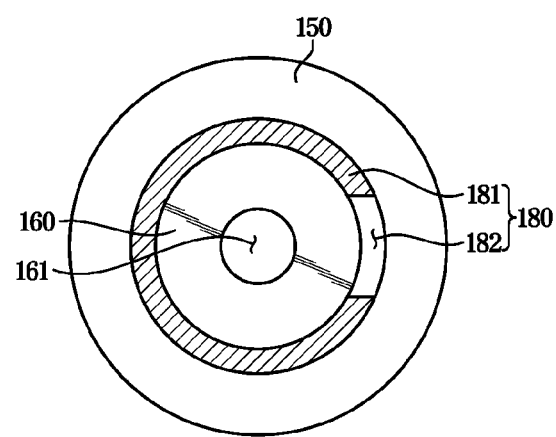
FIG. 3 is a cross-sectional view taken along line A-A' in FIG. 1.
Figure 4:
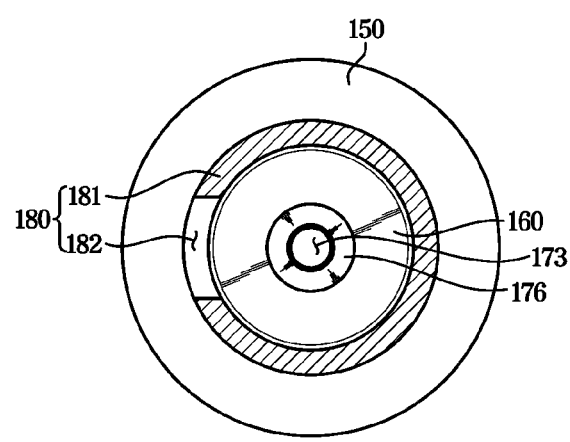
FIG. 4 is a cross-sectional view taken along line B-B' in FIG. 1.

FIGS. 3 and 4 are cross-sectional views taken along lines A-A' and B-B' in FIG. 1, respectively.

Referring to FIGS. 2 to 4, the flow resistance member 180 includes a ring body 181 interposed between the valve seat 160 and the magnet core 150 to block a flow path, and the slot 182 formed to penetrate through the ring body 181 to form the flow path. For example, the flow resistance member 180 may be provided such that a cross section viewed from above has a C-shape. However, a number, size, and shape of the slots 182 are not limited thereto, and various modifications are possible.

The flow resistance member 180 induces a fluid flow such that the fluid passes through the inner flow path 155 formed between the magnet core 150 and the valve seat 160 only through the slot 182. That is, the flow resistance member 180 generates a flow resistance to the braking fluid flowing between the orifice 161 and the second hydraulic port 10 by narrowing a cross-sectional area of the inner flow path 155.

In a case where the slots 182 of the plurality of flow resistance members 180 are formed in different directions with respect to a central axis, because friction occurs by the ring body 181 and the valve seat 160 as the fluid passed through one of the slots 182 flows toward the other of the slots 182, the flow resistance increases, so that the fluid flow may become slow. That is, while the fluid flow is mainly formed only in the vertical direction when the plurality of flow resistance members 180 is not provided, as the plurality of flow resistance members 180 is provided, the fluid flow between the respective flow resistance members 180 may be formed in a horizontal direction along the outer circumferential surface of the valve seat 160. Therefore, because by the flow resistance members 180, a path through which the fluid flows from the orifice 161 to the first hydraulic port 20 is lengthened and a section where friction occurs is lengthened, eddy currents generated when the fluid flows instantaneously at a high speed are reduced, so that vibration and noise caused by the eddy currents may be reduced.

When the orifice 161 is closed, the plurality of flow resistance members 180 may be in close contact with each other by a hydraulic pressure applied to the valve seat 160, and thus a gap maintaining protrusion 183 may be formed on the flow resistance member 180.

Figure 5:
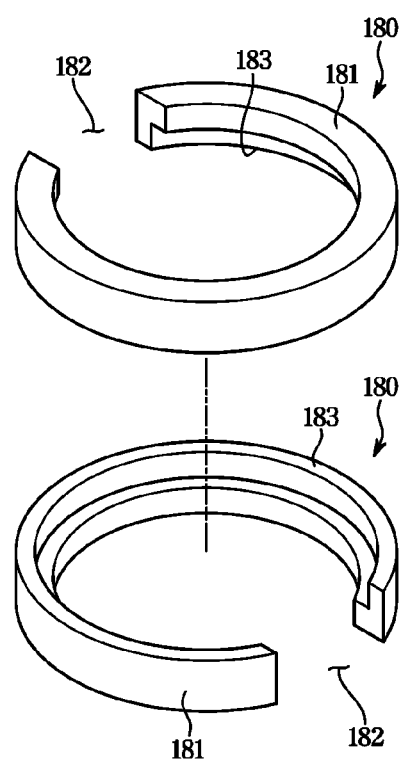
FIG. 5 is a perspective view of the flow resistance member having a gap maintaining protrusion according to an embodiment of the present disclosure.

FIG. 5 is a perspective view of the flow resistance member having a gap maintaining protrusion according to an embodiment of the present disclosure.

Referring to FIG. 5, the flow resistance member 180 may include a gap maintaining protrusion 183 protruding from an upper end or a lower end. For example, the flow resistance member 180 located at an upper side includes the gap maintaining protrusion 183 at the lower end thereof, and the flow resistance member 180 located at a lower side includes the gap maintaining protrusion 183 at the upper end thereof, so that even when the respective flow resistance members 180 are in close contact with each other by load or pressure, a space is created by the gap maintaining protrusions 183, thereby preventing the flow path from being blocked. That is, because when the plurality of flow resistance members 180 is in close contact with each other by load or pressure, the fluid may not flow smoothly, the gap maintaining protrusion 183 is provided at the upper end or the lower end of the flow resistance member 180 to secure the flow path.

The gap maintaining protrusion 183 serves to maintain a gap between the flow resistance members 180 adjacent to each other among the plurality of flow resistance members 180. In this case, a width of the gap maintaining protrusion 183 is provided to be at least smaller than a width of the ring body 181 in a radial direction, and accordingly, a flow path bypassing in a circumferential direction thereof may be formed.

The present embodiment illustrates that the gap maintaining protrusion 183 is provided along the circumference at the upper end or the lower end of the flow resistance member 180, but is not limited thereto, and various shapes and gaps may be provided as long as a gap between the flow resistance members 180 may be maintained, and the gap maintaining protrusions 183 may be arranged differently. It may be appropriate that the gap maintaining protrusions 183 between the adjacent flow resistance members 180 are formed in a direction opposite to each other.

Referring to FIGS. 2 and 3, the plurality of flow resistance members 180 may be press fitted into the valve seat 160, and the respective slots 182 of the plurality of flow resistance members 180 may be disposed at different positions. That is, the adjacent flow resistance members 180 may be disposed such that the respective slots 182 are not in communicate with each other. It may be appropriate that the respective slots 182 of the plurality of flow resistance members 180 are disposed in opposite directions, and in this case, the flow resistance is maximized.

For example, when two of the flow resistance members 180 are provided on the valve seat 160, the respective slots 182 of the flow resistance members 180 may be provided in opposite directions (see FIG. 3), and when three of the flow resistance members 180 are provided on the valve seat 160, the respective slots 182 may cross each other to be positioned in opposite directions.

An outer circumferential surface of the outlet filter 170 may be provided to be inserted into an inner circumferential surface of the bore 30.

The outlet filter 170 includes the circumferential portion 171 coupled to the outer circumferential surface 156 of the magnet core, and the first filter part 172 provided at a lower end of the circumferential portion 171 to communicate the first hydraulic port 20 and the inner flow path 155, and includes, at the center thereof, the boss portion 176 inserted into the valve seat 160 to communicate the orifice 161 and the second hydraulic port 10.

In more detail, the outlet filter 170 is provided in a cylindrical shape having an opening into which the magnet core 150 is inserted, and an inner diameter of the circumferential portion 171 corresponds to the outer circumferential surface 156 of the magnet core, so that the circumferential portion 171 and the outer circumferential surface 156 of the magnet core may be coupled to each other. The first filter part 172 to filter out foreign substances contained in the braking fluid or prevent the foreign substances from entering is provided below the circumferential portion 171 to surround the magnet core 150, so that the braking fluid may pass between the first hydraulic port 20 and the inner flow path 155 through the first filter part 172. The boss portion 176, which protrudes from the opening of the outlet filter 170 in a shape corresponding to the inner circumferential surface of the valve seat 160 and inserted into the valve seat 160, may communicate the orifice 161 and the second hydraulic port 10 by forming the connection flow path 173 in the axial direction or the vertical direction.

The outlet filter 170 may include the bypass passage 174 to communicate the inner flow path 155 and the connection flow path 173, and a ball valve 175 may be inserted into the bypass flow path 174. In more detail, the bypass passage 174 may be provided next to the boss portion 176 provided in the center of the outlet filter 170. The bypass flow path 174 may be a one-way check valve capable of releasing the hydraulic pressure by allowing the fluid to pass directly from the first hydraulic port 20 to the second hydraulic port 10 through the connection flow path 173 separately from the inner flow path 155 and the connection flow path 173 when the braking hydraulic pressure is released. That is, the ball valve 175 is disposed at a lower end of the bypass flow path 174 such that the fluid may not pass through the bypass flow path 174 when the braking hydraulic pressure is formed, and the fluid may pass through the bypass flow path 174 when the braking hydraulic pressure is released. In other words, the ball valve 175 allows only a flow of the braking fluid from the inner flow path 155 to the connection flow path 173. A detail thereof will be described later.

The inlet filter 190 may be coupled with the outlet filter 170 to communicate the second hydraulic port 10 and the connection flow path 173. The inlet filter 190 may include a second filter part 191 to filter out foreign substances contained in the braking fluid or prevents the foreign substances from entering.

Figure 6:
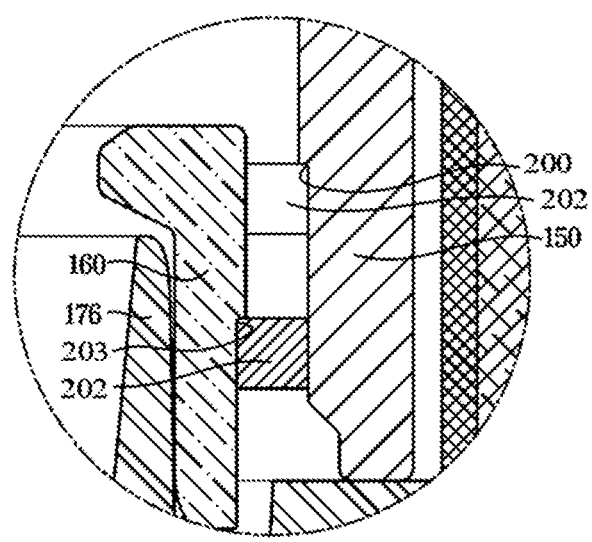
FIG. 6 is an enlarged view illustrating a modified example of a magnet core, a valve seat, and a flow resistance member according to the present disclosure.

FIG. 6 is an enlarged view illustrating a modified example of a magnet core, a valve seat, and a flow resistance member according to the present disclosure.

Referring to FIG. 6, the magnet core 150 may include a first support protrusion 200 on an inner circumferential surface in which the inner space 152 is formed. For example, when the flow resistance member 180 located at an upper side is referred to as a first ring 201, and the flow resistance member 180 located at a lower side is referred to as a second ring 202, the first ring 201 supported on the first support protrusion 200 may be provided to have an inner diameter larger than the second ring 202 provided below the first support protrusion 200. Accordingly, because the first ring 201 may be supported by the first support protrusion 200 even when the first ring 201 receives a load or pressure upward, the first ring 201 may be moved only within a certain section.

The present embodiment illustrates that one of the support protrusion is formed on the magnet core 150, but is not limited thereto. That is, a position and number of the support protrusions may be variously provided as long as the support protrusion may support the flow resistance member 180, and similarly, a shape and number of the flow resistance members 180 supported by the support protrusions may also be variously provided as long as the flow resistance members may generate a flow resistance.

Referring to FIG. 6, a second support protrusion 203 may be provided inward on the outer circumferential surface of the valve seat 160 so that the flow resistance member 180 may not move upward in the drawing. For example, when the flow resistance member 180 located at an upper side is referred to as the first ring 201, and the flow resistance member 180 located at a lower side is referred to as the second ring 202, the second ring 202 supported on the second support protrusion 203 may be provided to have an inner diameter smaller than the first ring 201 provided above the second support protrusion 203. Accordingly, because the second ring 202 may be supported by the first support protrusion 200 even when the second ring 202 receives a load or pressure upward, the second ring 202 may be moved only within a certain section.

The present embodiment illustrates that one of the support protrusion is formed on the valve seat 160, but is not limited thereto. That is, a position and number of the support protrusions may be variously provided as long as the support protrusions may support the flow resistance members 180, and similarly, a shape and number of the flow resistance members 180 supported by the support protrusions may also be variously provided as long as the flow resistance members may generate a flow resistance.

Figure 7:
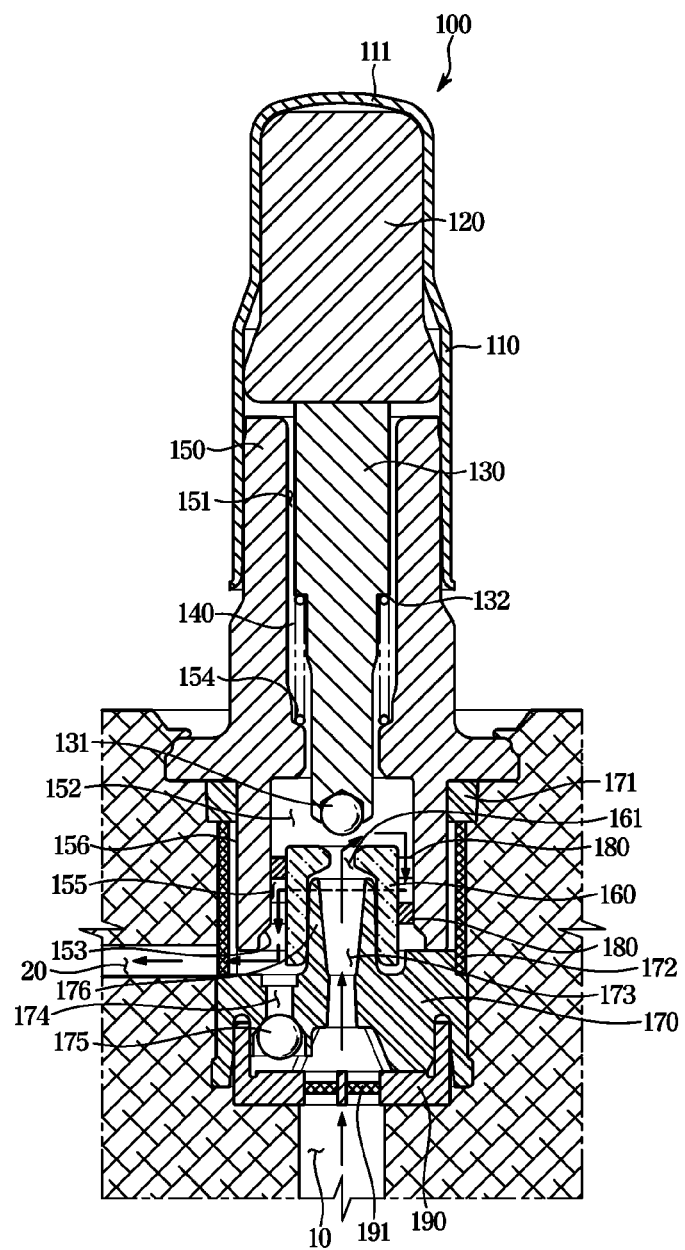
FIG. 7 is a view illustrating a fluid flow when a braking hydraulic pressure is formed in the solenoid valve according to an embodiment of the present disclosure.

FIG. 7 is a view illustrating a fluid flow when a braking hydraulic pressure is formed in the solenoid valve according to an embodiment of the present disclosure.

Referring to FIG. 7, the solenoid valve according to the present disclosure corresponds to a normally open valve that is open in a normal state.

When an ABS system or the like is operated, power is applied to the excitation coil assembly so that a magnetic force acts between the armature 120 and the plunger 130. When the magnetic force becomes greater than the elastic force of the elastic member 140, the plunger 130 descends while compressing the elastic member 140 so that the opening/closing member 131 may close the orifice 161 to block the fluid flow. In addition, when braking is required instantaneously in the ABS system or the like and a braking hydraulic pressure is formed, the orifice 161 is opened so that the fluid may be rapidly introduced.

According to an embodiment of the present disclosure, the flow resistance member 180 is provided on the valve seat 160 to slow the fluid flow. In more detail, when the braking hydraulic pressure is formed, the orifice 161 is opened so that the fluid flows into the inner space 152 of the magnet core 150 by passing through the second hydraulic port 10, the connection flow path 173, and the orifice 161, and then flows to the first hydraulic port 20 by passing through the inner flow path 155. At this time, as the flow resistance member 180 is provided, the space through which the fluid flows is narrowed, and at the same time friction occurring when the fluid flows through the slot 182 of the flow resistance member 180 increases, so that the fluid flow may become slow. In addition, the fluid passed through the first hydraulic port 20 may be supplied to the brake system to form a braking pressure.

Figure 8:
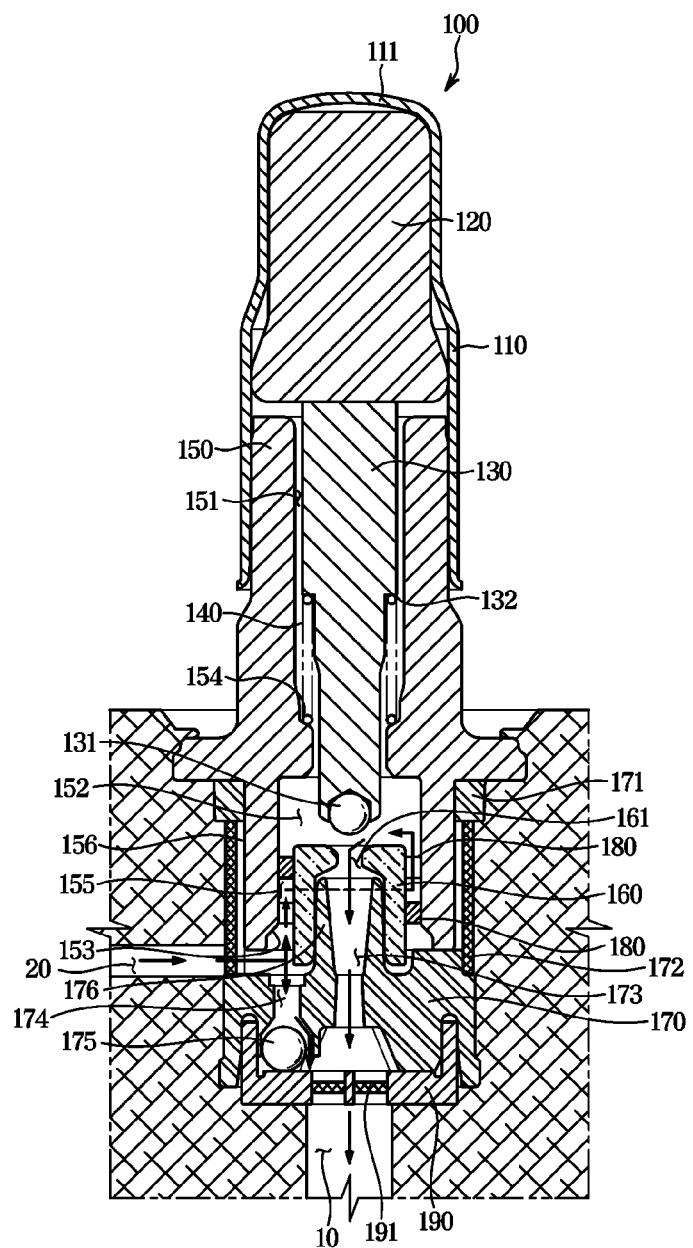
FIG. 8 is a view illustrating a fluid flow when the braking hydraulic pressure is released in the solenoid valve according to an embodiment of the present disclosure.

FIG. 8 is a view illustrating a fluid flow when the braking hydraulic pressure is released in the solenoid valve according to an embodiment of the present disclosure.

Referring to FIG. 8, when the braking hydraulic pressure is released, the fluid may be discharged through a first route in which the fluid passes through the inner flow path 155 and the orifice 161 from the first hydraulic port 20 and then flows to the second hydraulic port 10, and a second route in which the fluid passes through the bypass flow path 174 from the first hydraulic port 20 and then flows to the second hydraulic port 10. As such, when the braking hydraulic pressure is quickly released, the braking system returns quickly, so dragging may occur relatively less.

In other words, when the braking hydraulic pressure is released, the fluid may flow not only through the first route of allowing the fluid to pass through the inner flow path 155 but also through the second route of allowing the fluid to pass through the bypass flow path 174, so that the braking hydraulic pressure may be released faster than when the braking hydraulic pressure is formed.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. A solenoid valve configured to be installed in a bore of a modulator block having a first hydraulic port and a second hydraulic port to control a flow of a braking fluid, the solenoid valve comprises:
    a sleeve;
    an armature provided inside the sleeve;
    a plunger configured to ascend and descend by the operation of the armature;
    an elastic member configured to press the plunger toward the armature;
    a magnet core having a through hole in which the plunger and the elastic member are provided and forming an inner space in a longitudinal direction;
    a valve seat provided in the inner space and on which an orifice penetrating in an axial direction is formed to be opened and closed by the plunger; and a plurality of flow resistance members comprising a first flow resistance member and a second flow resistance member coupled with the first flow resistance member, each of the plurality of the flow resistance members comprising a ring body interposed between the valve seat and the magnet core to generate a flow resistance of the braking fluid, and a slot formed at one side of the ring body to penetrate through the ring body so that the braking fluid passes therethrough, wherein the magnet core comprises a first support protrusion protruding from an inner circumferential surface thereof to support an upper end of the first flow resistance member, and wherein the valve seat comprises a second support protrusion protruding from an outer circumferential surface thereof to support an upper end of the second flow resistance member.

2. The solenoid valve according to claim 1, wherein the respective slots of the plurality of flow resistance members are disposed in different directions with respect to a central axis.

3. The solenoid valve according to claim 2, wherein the respective slots are disposed in opposite directions with respect to the central axis.

4. The solenoid valve according to claim 1, wherein the ring body comprises a gap maintaining protrusion protruding from an upper end or a lower end thereof.

5. The solenoid valve according to claim 4, wherein the gap maintaining protrusion is provided such that a width thereof is at least smaller than a width of the ring body and is formed along a circumferential direction.

6. The solenoid valve according to claim 1, further comprising
an outlet filter comprising: a circumferential portion in which an inner circumferential surface thereof is coupled to an outer circumferential surface of the magnet core;
a first filter part provided at a lower end of the circumferential portion to filter out foreign substances contained in the braking fluid flowing through an inner flow path between the first hydraulic port and the orifice; and
a boss portion inserted into the valve seat to form a connection flow path between the orifice and the second hydraulic port.

7. The solenoid valve according to claim 6, wherein the outlet filter further comprises a bypass flow path to communicate the inner flow path and the connection flow path, and
the bypass flow path comprises a ball valve provided to allow only a flow of the braking fluid from the inner flow path to the connection flow path.

8. The solenoid valve according to claim 7, further comprising
an inlet filter coupled with the outlet filter and comprising a second filter part to filter out foreign substances contained in the braking fluid flowing between the second hydraulic port and the connection flow path.

9. A solenoid valve configured to be installed in a bore of a modulator block having a first hydraulic port and a second hydraulic port to control a flow of a braking fluid, the solenoid valve comprises:
a sleeve;
an armature provided inside the sleeve;
a plunger configured to ascend and descend by the operation of the armature;
an elastic member configured to press the plunger toward the armature;
a magnet core having a through hole in which the plunger and the elastic member are provided and forming an inner space in a longitudinal direction;
a valve seat provided in the inner space and on which an orifice penetrating in an axial direction is formed to be opened and closed by the plunger; and
a first ring and a second ring each comprising a ring body interposed between the valve seat and the magnet core to generate a flow resistance of the braking fluid, and a slot formed at one side of the ring body to penetrate through the ring body so that the braking fluid passes therethrough,
wherein the magnet core comprises a first support protrusion protruding from an inner circumferential surface thereof to support an upper end of the first ring, and
wherein the valve seat comprises a second support protrusion protruding from an outer circumferential surface thereof to support an upper end of the second ring.

10. The solenoid valve according to claim 9, wherein a predetermined gap is maintained between a lower end of the first ring and the upper end of the second ring.

11. The solenoid valve according to claim 9, wherein the respective slots of the first ring and the second ring are disposed in different directions with respect to a central axis.

12. The solenoid valve according to claim 11, wherein the respective slots are disposed in opposite directions with respect to the central axis.

13. The solenoid valve according to claim 9, further comprising
an outlet filter comprising: a circumferential portion in which an inner circumferential surface thereof is coupled to an outer circumferential surface of the magnet core;
a first filter part provided at a lower end of the circumferential portion to filter out foreign substances contained in the braking fluid flowing through an inner flow path between the first hydraulic port and the orifice; and
a boss portion inserted into the valve seat to form a connection flow path between the orifice and the second hydraulic port.

14. The solenoid valve according to claim 13, wherein the outlet filter further comprises a bypass flow path to communicate the inner flow path and the second hydraulic port, and
the bypass flow path comprises a ball valve provided to allow only a flow of the braking fluid from the inner flow path to the connection flow path.

15. The solenoid valve according to claim 14, further comprising
an inlet filter coupled with the outlet filter and comprising a second filter part to filter out foreign substances contained in the braking fluid flowing between the second hydraulic port and the connection flow path.

16. A solenoid valve configured to be installed in a bore of a modulator block having a first hydraulic port and a second hydraulic port to control a flow of a braking fluid, the solenoid valve comprises:
a sleeve;
an armature provided inside the sleeve;
a plunger configured to ascend and descend by the operation of the armature;

an elastic member configured to press the plunger toward the armature;

a magnet core having a through hole in which the plunger and the elastic member are provided and forming an inner space in a longitudinal direction;

a valve seat provided in the inner space and on which an orifice penetrating in an axial direction is formed to be opened and closed by the plunger; and a plurality of flow resistance members comprising a first flow resistance member and a second flow resistance member coupled with the first flow resistance member, each of the plurality of the flow resistance members comprising a ring body interposed between an outer circumferential surface of the valve seat and an inner circumferential surface of the magnet core to generate a flow resistance of the braking fluid, and a slot formed at one side of the ring body to penetrate through the ring body so that the braking fluid passes therethrough.

17. A solenoid valve configured to be installed in a bore of a modulator block having a first hydraulic port and a second hydraulic port to control a flow of a braking fluid, the solenoid valve comprises:

a sleeve;

an armature provided inside the sleeve;

a plunger configured to ascend and descend by the operation of the armature;

an elastic member configured to press the plunger toward the armature;

a magnet core having a through hole in which the plunger and the elastic member are provided and forming an inner space in a longitudinal direction;

a valve seat provided in the inner space and on which an orifice penetrating in an axial direction is formed to be opened and closed by the plunger; and a first ring and a second ring each comprising a ring body interposed between an outer circumferential surface of the valve seat and an inner circumferential surface of the magnet core to generate a flow resistance of the braking fluid, and a slot formed at one side of the ring body to penetrate through the ring body so that the braking fluid passes therethrough, wherein the magnet core comprises a first support protrusion protruding from the inner circumferential surface thereof to support an upper end of the first ring.

* * * * *